United States Patent [19]

Rogen

[11] Patent Number: 4,472,113

[45] Date of Patent: Sep. 18, 1984

[54] PUMPING BY MARTENSITIC TRANSFORMATION UTILIZATION

[76] Inventor: Neil E. Rogen, c/o Memory Metals, Inc., 652 Glenbrook Rd., Bldg. #3, Stamford, Conn. 06906

[21] Appl. No.: 341,852

[22] Filed: Jan. 22, 1982

[51] Int. Cl.³ .............................................. F03G 7/06
[52] U.S. Cl. ...................................... 417/321; 60/527
[58] Field of Search ............... 417/321, 322, 328, 329, 417/379; 60/527, 528

[56] References Cited

U.S. PATENT DOCUMENTS

| | | | |
|---|---|---|---|
| 3,613,732 | 10/1971 | Willson et al. | 137/625.44 |
| 4,018,547 | 4/1977 | Rogen | 417/321 |
| 4,325,217 | 4/1982 | Golestaneh | 60/527 |

*Primary Examiner*—Richard E. Gluck
*Attorney, Agent, or Firm*—Jerry Cohen; M. Lawrence Oliverio

[57] ABSTRACT

Pumping in oil wells and like power conversion applications is carried out in an economical manner with efficient utilization of energy and low capital cost by pushing or pulling the plunger mechanism (of conventional type) with a metal wire, rod or tube arranged as a helical coil spring and constructed of a material that exhibits shape memory effect. This is accomplished by cyclically first straining the helical coil by loading it with a mechanical load and thus causing a structural transformation or martensitic transformation in the material and then upon the application of heat thereto (by electrical self heating or an external heater in proximity thereto), reversing the transformation to contract in material length with a fractional multiplier effect on contraction in length of the helical coil to raise the plunger, the coil having an expanded to compressed length ratio of 2:1 or substantially greater.

4 Claims, 5 Drawing Figures

PUMPING BY MARTENSITIC TRANSFORMATION UTILIZATION

BACKGROUND OF THE INVENTION

The present invention relates to oil well pumping and like power conversion applications and is particularly characterized by the carrying out of such pumping with economy of capital cost and energy utilization compared to state of the art pumping and in the noiseless manner with which the system of the invention operates and reduced vulnerability to breakage of the system.

Since the major underground oil well discoveries of the mid 19th century, oil well pumping has been carried out by essentially providing a piston or plunger in a tube at the end of a long rod ("sucker rod") which is stroked by an above-ground pump jack consisting of a prime mover or motor and gear reducer, pitman crank, counterweight, walking beam and mechanical linkage to reciprocate the sucker rod thus lowering and lifting a piston or plunger mechanism attached to the lower end of the rod and which in a downstroke reaches into oil in the casing defining the oil well and on the upstroke raises oil. My prior U.S. Pat. No. 4,018,547 describes utilization of certain shape memory alloy wire or said materials to replace the sucker rod and above ground equipment therefor. Such materials are capable of undergoing martensitic transformation while being cold worked and reversing the transformation on subsequent heating.

One can best describe the shape memory effect (SME) as follows. A wire, rod or piece of tubing of (SME) alloy which is deformed in the low temperature martensitic state will regain its original or memory shape upon heating. Materials exhibiting the reverse arrangement can also be made. Alloy selection can be made for specific martensitic transformation temperatures at desired levels.

Strains of up to 6 to 8% may be completely recovered in such materials. During recovery, real work can be accomplished. This recovery of memorized shape is a result of the reverse crystalline transformation of the deformed martensitic phase to the higher temperature parent phase. There are now many alloys known that exhibit the shape memory or martensitic memory effect. Some of these are nickel-titanium, nickel-aluminum, iron-platinum, copper-zinc, copper-zinc-aluminum, copper-zinc-gallium, copper-zinc-tin, copper-aluminum-nickel, copper-gold-zinc, copper-tin and gold-cadmium. These alloys are ordered and crystalographically have exhibited reversible, thermoelastic martensitic transformations.

It is an important object of the present invention to provide an improvement to my above cited invention in pumping in oil wells and other applications which in common with such invention avoids the above-ground motor and mechanical transmission and their associated capital costs, noise, friction (with attendant energy costs) and mechanical breakdown vulnerabilities and further accomplishes such while lowering oil viscosity and/or eliminating paraffin buildup in the well.

It is a further object of the invention to provide a faster stroke cycle consistent with one or more of the preceding objects.

It is a further object of the invention to reduce vulnerability of pumping system to breakage of the sucker rod within the well consistent with the preceding object.

It is a further object of the invention to provide a wide range of pump displacement (which enables an improvement in the pump stroke rate) compared with the pumps as described in my prior U.S. Pat. No. 4,018,547 consistent with one or more of the preceding objects.

It is a further object of the invention to provide a long life, reliable pumping apparatus consistent with one or more of the preceding objects.

It is a further object of the invention to provide precise control of stroke consistent with one or more of the preceding objects.

SUMMARY OF THE INVENTION

A long wire (actual wire, rod or virtual wire, e.g. as formed by spirally cutting a slit in a tube) or tube of elongated martensitic transformation metal is formed as a helical coil spring and placed at the bottom of the well to be pumped or in another appropriate location for fluid pumping. Such martensitic transformation materials, per se, are described above and in my prior U.S. Pat. Nos. 3,440,997, 3,483,752, 3,483,748, and 4,018,547 and U.S. patents of others—i.e. U.S. Pat. Nos. 3,174,851 and 3,403,238 and 3,613,732 disclosures all of which are incorporated herein by reference as though set out at length therein.

The helical coil may be expanded or contracted longitudinally by carrying the weight of a piston/valve or plunger mechanism, or by means of a bias spring or weight. The bias spring compensates the hysteresis of an unloaded spring and the piston will move at a more specific temperature. Such weight causes the cold wire of the coil to undergo martensitic transformation, providing a long stroke consistent with reversibility. Approximately equal to one-half or more than the original length.

The necessary heating may be accomplished through resistance heating, either direct electrical resistance heating or heating a high electrical resistive wire or element which is within a tube of martensitic transformation material or simply wrapped around a rod or cable of martensitic transformation material or by rf or induction electrical heating. Non-electrical heating, e.g., pouring warm fluid over the coil may be utilized. Cooling may be accomplished by flowing liquid coolant along the coiled wire or cable (or through a wire-like tube) or through Peltier effect refrigeration, applied directly or indirectly or by the pumped fluid. Oil in shallow oil wells (less than 2000 feet deep) is usually less than 100° F. and the bottom hole temperature of most oil wells is less than 200° F. By selecting a SME alloy whose transformation temperature is higher than the oil temperature (allowing when necessary for a buildup in bottom hole temperature due to repeated heating during cycling of the SME pump drive) one can cool by allowing the pumped oil to pass over or through the coil of SME alloy.

It is preferred to have the coil in the elongated configuration if heating is by direct electrical resistance. This will eliminate the necessity of insulating the coils from one another so that the full length of the wire or tubing will provide the electric circuit. If the coil is in its compressed configuration, indirect heating will be possible and will be more efficient because the coil will present a smaller surface area thus minimizing heat losses. To further minimize heat losses, a rectangular cross section of wire or tubing could be used so that a minimal outside surface will be presented for cooling. Or if the cooling segment of the cycle is too long, one could fabricate the rectangular cross section so that a maximum surface is available for cooling.

The "wire" may be a tube which is hollow or filled with an electrical heater wire or overwound with such wire for indirect electrical heating (or heated by inductive coupling from a power source). If hollow, the tube can be heated by using it as a heat pipe (a device comprising liquid and a vaporizer for cyclic vaporization and condensation). See U.S. Pat. No. 3,987,630 which is incorporated herein by reference.

For example, a 2.5 inch outer diameter coil spring would be formed of 0.417 inch O.D. and 0.257 inch I.D. tubing diameter shape memory allow (martensitic transformation material) in a length sufficient to form 50–60 turns with an at-rest length of 4–5 feet and a stroke (added coil length) of two or two and one half feet when gravity loaded by the weight of a piston/valve mechanism and tare weight carried thereon or a bias spring. The two foot down stroke is reversed into an up stroke as the coil (and actual wire length) contracts on heating to lift a load of oil and mechanism. The load lifted is 300–400 pounds, ⅔ or more of which is oil weight. This cycle can be at a rate of 2–10 times a minute (depending on thermal inertia) to produce ½–100 barrels of oil a day. This configuration may also be used so that the piston rests on the coil spring and upon heating the coil spring, pushes the piston up instead of pulling.

The alloy is selected as one which can effect its "cold" martensitic transformation at typical downhole ambient temperatures of 2000–3000 foot deep wells, i.e. 45°–60° C. The heating applied to reverse martensitic transformation is 30°–50° C. above cold temperature condition, but not so high as to damage or irreversibly alter the material, associated pumping equipment or instrumentation or the oil itself.

The overall efficiency of energy used (work done versus input electrical energy) of such a device can be 5–10% (comparable in real terms to state of the art mechanical "sucker rod" apparatus). However, that heat energy not utilized in mechanical work heats the down hole well bore and will reduce oil viscosity and eliminate or minimize paraffin problems.

Other objects, features and advantages of the invention will be apparent from the following detailed description of preferred embodiments when taken in connection with the accompanying drawing, in which,

DETAILED DESCRIPTION OF PREFERRED EMBODIMENTS

Figure 1:
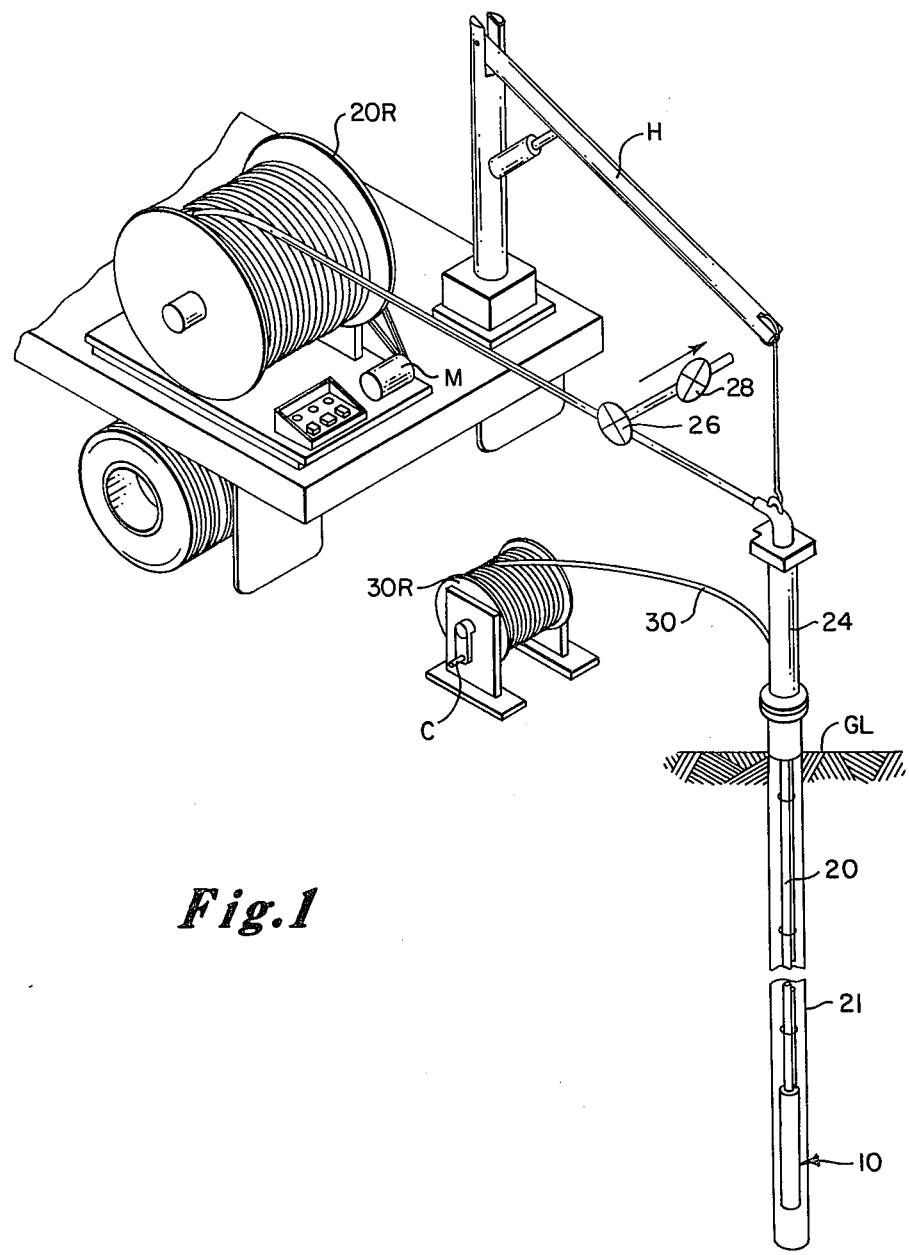
FIGS. 1 and 2 are schematic views of an oil well pump apparatus according to a preferred embodiment of the invention.
Figure 2:
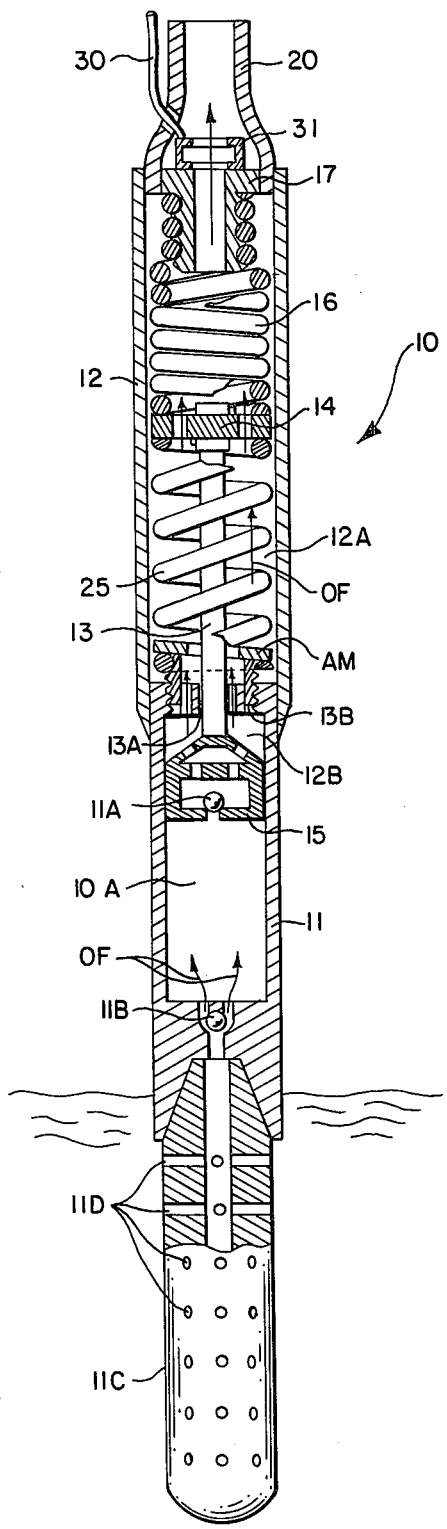

Referring to FIGS. 1–2, there is shown an oil well system utilizing a first preferred embodiment of the invention.

A shape memory effect (SME) pump 10 in an oil well casing 21 is suspended by a tubing length 20 fed from a motor (M) driven reel 20R via a ground level (GL) seal 24 controllably supported by a hydraulic hoist H. A tap-off 26 and valve 28 may be provided for delivery of pumped oil to external storage and delvery means. An electrical wire 30 is fed from reel 30R, which has a crank handle C, through the seal 24 to pass down to pump 10 and there provided cyclic and/or selective activation control to a coiled shaped memory alloy (SME) activating material within the pump.

The pump 10 comprises a lower housing section 11 and a higher housing section 12.

The lower casing section has piston mounted ball-type traveling check valve 11A and standing valve 11B and filter member 11C with inlet ports 11D, all per se conventional in the sucker rod pump technology of the oil well industry. A guide rod 13 is slidable in a bore 13A of apertured fixed plate 13B and interconnects an apertured head plate 14 with the piston 15 (which contains the traveling valve).

The upper casing section 12 contains the head plate 14 which is connected to an SME coil 16 which is in turn connected to an apertured fixed plate 17. Also connected thereto is an opposing bias spring 25. The electric cable 30 connects to the primary winding of a transformer 31 the secondary circuit of which is interlaced with the coil 16 to provide selective and/or cyclic electric resistance heating (depending on control of electric power input at ground level).

When the assemblage of 13-14-15 descends by gravity, oil in chamber 10A moves past valve 11A into 12B region, and the coil 16 is stretched out and thereby cold worked. The material of coil 16 is selected so that the oil well ambient temperature is below the SME martensitic transformation temperature.

Heat can be applied via cable 30 to heat coil 16 above the martensitic transformation temperature to reverse the elongation and cause a contraction thereof raising parts 13-14-15. This causes a raiding of the oil column (valve 11A being closed) and allows in-rush of oil from a pool (in which lower casing 11 is located) and flow thereof past check valve 11B.

The heating can be terminated to allow cooling of coil 16.

The whole process can be cyclically repeated.

Figure 3:
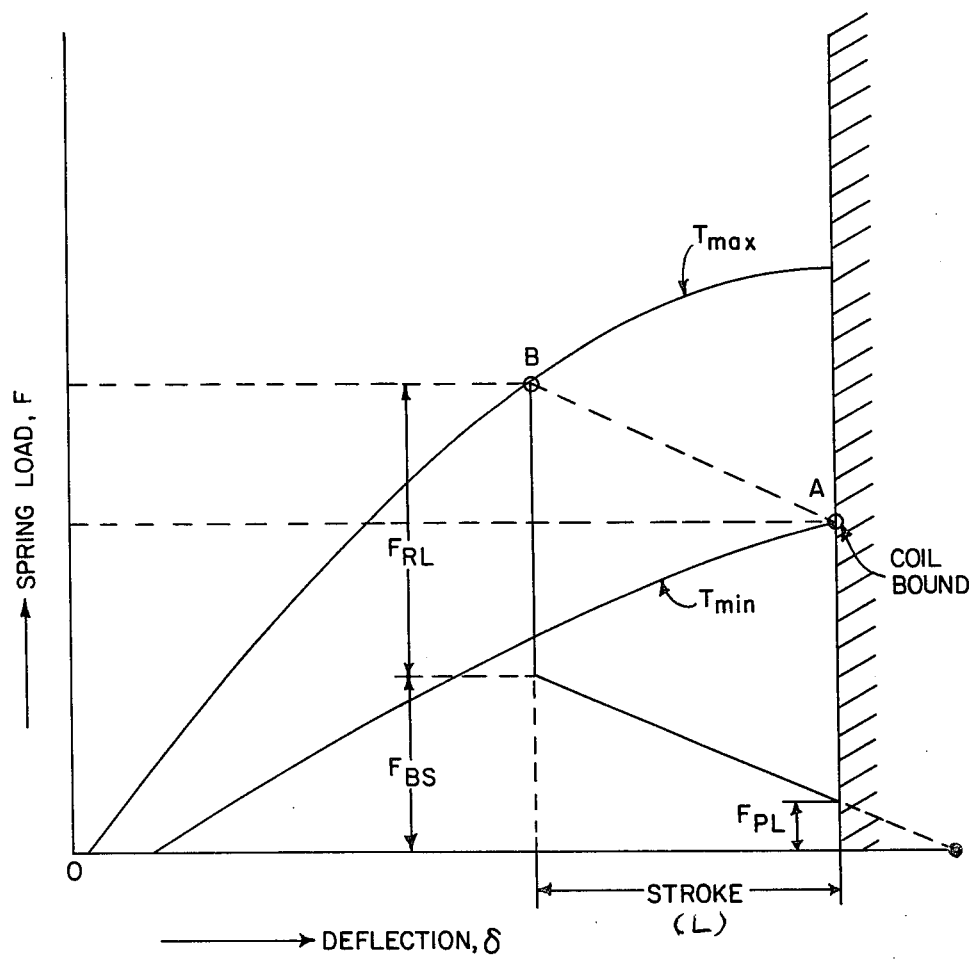
FIG. 3 is a spring load-deflection diagram for the system.

The equilibrium diagram for the oil pumping cycle as described above is sketched diagrammatically in FIG. 3, where a typical spectrum of load/deflection/temperature for a SME spring element is shown superimposed with lines of constant resultant load and constant stiffness of a bias spring. Points of intersection of the lines with the SME spectrum represent points of equilibrium between the working force and the element. As seen in FIG. 3, the SME spring would deflect by an amount L under the action of the total load $F_B$, as the temperature changed from T min. to T max.

For a given stroke L, decreasing the bias spring preload can be seen to provide the higher load of weight of oil that can be lifted. In addition, increasing the stiffness of the bias spring can be seen to cause the increase of the force against the SME spring and thus reducing the stroke.

Figure 4:
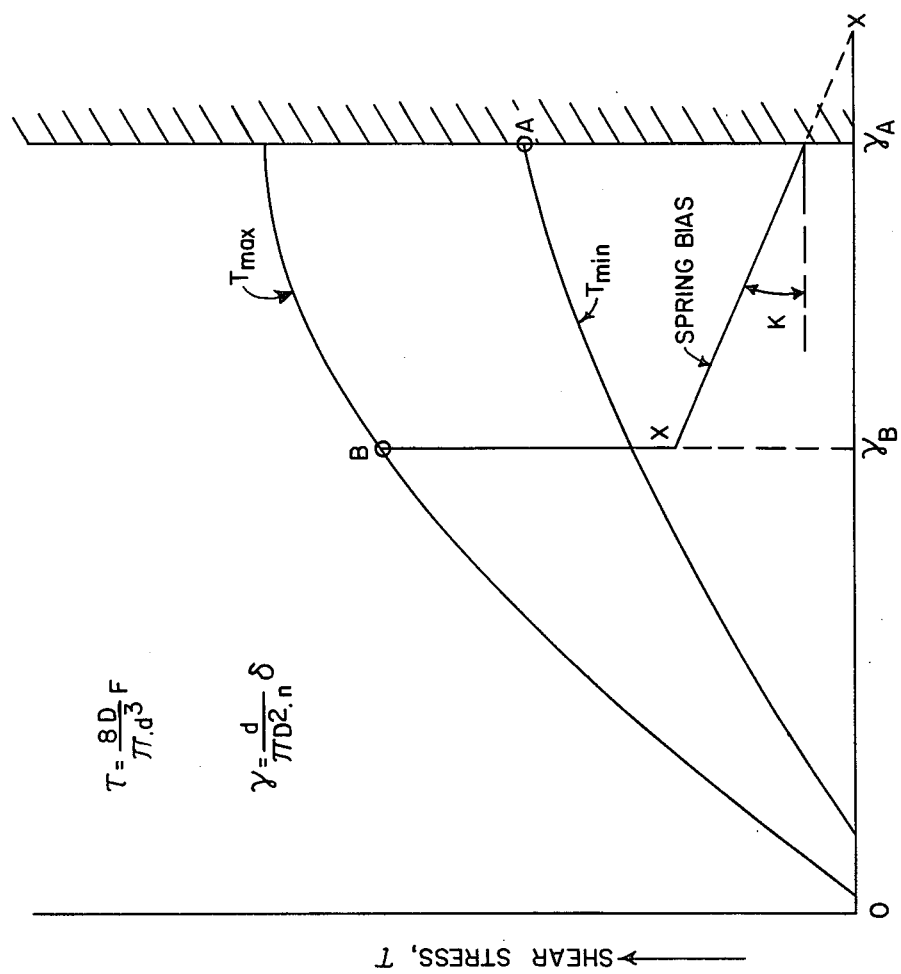
FIG. 4 is a stress-strain diagram for the pumping element (constituting with FIG. 3 a design chart device)

The following step of design is to superimpose FIG. 3 onto the stress-strain spectrum, so that the specificed temperatures at A and B are compatible with the equivalent points on the Design Chart (see FIG. 4). Symbols used in such a chart comprise:
F: spring load
δ: spring deflection
τ: torsional shearing stress
ϑ: torsional shearing strain
d: wire diameter
D: mean coil diameter
n: number of active coils
K: spring constant (stiffness)
G: elastic shear modulus
L: stroke The dimensions of the SME spring as well as the bias spring can then be determined by considering the requirements at points A and B on the Design Chart, as follows:

At point A:
Shear stress is given by:

$$\tau_A = \frac{8D}{\pi d^3} F_A$$

where, $F_A = F_{RL} + F_{PL}$
$F_{RL}$ is the resultant load
$F_{PL}$ is the pre-load of bias spring At point B:
Shear stress is given by:

$$\tau_B = \frac{8D}{\pi d^3} F_B$$

Where, $F_B = F_{RL} + F_{BS}$
$F_{BS}$ is the instantaneous load of bias spring.
The Strain change between points A and B:

$$\text{Change of shear strain} = \gamma_A - \gamma_B = \frac{d}{\pi D^2 n} \text{ (stroke)}.$$

The stiffness of the bias spring (K) can also be determined, as follows:

$$K = \frac{\partial F}{\partial \delta} = \frac{\partial F}{\partial \gamma} \cdot \frac{\partial \gamma}{\partial \delta}$$

Now, $$\frac{\partial F}{\partial \gamma} = \frac{1}{8D/\pi d^3} \cdot \frac{\partial (F \cdot 8D/\pi d^3)}{\partial \gamma}$$

and $$\frac{\partial \gamma}{\partial \delta} = \frac{d}{\pi D^2 n}$$

Whence, $$K = \frac{d^4}{8D^3 n} \cdot \frac{\partial \tau}{\partial \delta}$$

The value of $(\partial \tau)/(\partial \gamma)$ is evaluated from FIG. 4, i.e. the slope of Line X—X. And the material property of the bias spring which is reflected by the elastic shear modulus G can be evaluated from:

$$G = \frac{8 \cdot n \cdot D^3}{d^4} K$$

In the simplified model used above as the basis for analysis in this note, the resultant load due to the weight of fluid load, etc., is assumed to be constant during a pump cycle. However, this assumption may be overestimation since the distribution of the pumping cycle loads fluctuates along the stroke cycle.

Figure 5:
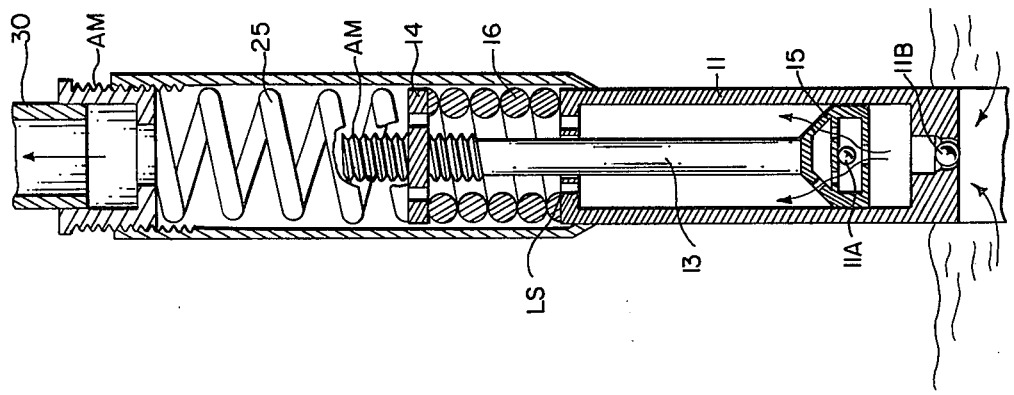
FIG. 5 is a schematic cross section view (similar to FIG. 2) of another preferred embodiment of the invention.

In the pump of FIG. 5 the positions of SME spring 16 and bias spring 25 are reversed compared to FIG. 2. In the FIG. 5 apparatus spring 16 contracts on cooling to produce a downstroke. On heating the spring system will produce an upstroke. This arrangement reduces the possibility of short circuiting between turns of the directly heated coils during the upstroke, top and beginning of downstroke (and therefore avoids an untimely heating-induced transformation).

An advantage to using extension SME springs is avoidance of buckling of the springs. For relatively long strokes a spring that extends upon heating (compression spring) is subject to buckling. A buckled spring will rub against its container and will not transmit as much force. Thus, if one wants a long stroke using compression springs, he must use a number of shorter springs in tandem. However, if one uses an extension spring (compresses upon heating) a single long spring can be used without fear of buckling or loss of available mechanical energy.

Both the FIG. 2 and FIG. 5 embodiments have screw-threaded adjusting means AM for adjusting the length of stroke and the loading characteristics of the bias spring/SME spring arrangement.

A piezoelectric load sensor (LS, FIG. 5) may be provided to electrically terminate heating at the end of a downstroke.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and technique herein disclosed and limited solely by the spirit and scope of the appended claims.

What is claimed is:
1. Pumping apparatus comprising,
means defining a pumping piston member for cyclically contacting a liquid pool,
means defining an elongated martensitic transformation member formed as an extension coil spring and
means interconnecting said piston member and said coil spring member and bias spring means for working against coil spring deformation,
the weight of the piston member being sufficient to mechanically deform said coil through gravity descent of the member through at least a 50% increase in coil length and thereby induce the martensitic transformation of the material thereby induce the at a first relatively cold temperature,
means for periodically heating said martensitic material while heating the adjacent liquid pool area, to reverse said transformation and thereby reverse the coil's extended deformation to induce compression thereof to raise the piston member, and means for force cooling the material to provide cyclic lowering and raising portions of a pumping cycle.

2. Pumping apparatus in accordance with claim 1 wherein the heating means comprises means for direct electrical resistance heating of the martensitic material.

3. Pumping apparatus in accordance with claim 1 wherein the heating means comprise electrical resistance means indirectly heating the martensitic material.

4. The apparatus of claim 1 wherein the bias means comprises a coil spring and further comprising means for adjusting the coil lengths of the martensitic spring and the bias spring.

* * * * *